US 6,713,706 B2

(12) United States Patent
Akiyoshi et al.

(10) Patent No.: US 6,713,706 B2
(45) Date of Patent: Mar. 30, 2004

(54) JUMP CONTROL APPARATUS FOR ELECTRIC DISCHARGE SHAPING/ PROFILING MACHINE

(75) Inventors: Masao Akiyoshi, Tokyo (JP); Takashi Yuzawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 54 days.

(21) Appl. No.: 10/138,294

(22) Filed: May 6, 2002

(65) Prior Publication Data

US 2003/0062342 A1 Apr. 3, 2003

(30) Foreign Application Priority Data

Oct. 3, 2001 (JP) .................................... 2001-307305

(51) Int. Cl.[7] ................................................ B23H 7/32
(52) U.S. Cl. .................................................. 219/69.16
(58) Field of Search ............................ 219/69.16, 69.2; 700/162

(56) References Cited

U.S. PATENT DOCUMENTS 5,117,083 A * 5/1992 Kawamura ............... 219/69.16
5,428,201 A * 6/1995 Kaneko et al. ........... 219/69.16
5,900,165 A * 5/1999 Taneda ..................... 219/69.16
6,147,500 A * 11/2000 Imai et al. ................ 219/69.16

FOREIGN PATENT DOCUMENTS

| JP | 10-309630 | 11/1998 |
|---|---|---|
| JP | 2001-9642 | 1/2001 |

* cited by examiner

Primary Examiner—Geoffrey S. Evans
(74) Attorney, Agent, or Firm—Leydig, Voit & Mayer, Ltd.

(57) ABSTRACT

A jump control apparatus for an electric discharge machine ensuring high machining precision while reducing machining time by removing sludge speedily, regardless of differences in shape among workpieces, includes a feed control unit for controlling a vertical position of an electrode relative to a workpiece, a jump condition estimating unit for estimating jump conditions for the electrode for removing the sludge between the electrode and the workpiece during machining. The jump conditions generated are input to the feed control unit. The apparatus includes an input unit for inputting machining conditions relating to the jump conditions in precedence to machining, and a numerical control unit for determining various parameters in dependence on the machining conditions. The parameters are input to the jump condition estimating unit for estimating the jump conditions through feed-forward control using the parameters.

20 Claims, 6 Drawing Sheets

JUMP CONTROL APPARATUS FOR ELECTRIC DISCHARGE SHAPING/PROFILING MACHINE

BACKGROUND OF THE INVENTION

1. Field of the Invention

The present invention generally relates to an electric discharge shaping/profiling machine such as a die sinking electric discharge machine, an electric spark machine or the like for shaping or profiling (i.e., machining in more general terms) a workpiece by applying a pulse-like voltage across an electrode and the workpiece between which a processing liquid or solution such as a dielectric liquid intervenes. More particularly, the present invention is concerned with a jump control apparatus for the electric discharge shaping/profiling machine, which apparatus is designed for improving the precision of machining (or machining precision) while allowing the time taken for the machining process to be shortened essentially without being influenced by geometrical factors such as shape or profile to be finally imparted to the workpiece.

2. Description of Related Art

In the electrical discharge shaping/profiling machine such as the die sinking electric discharge machine or the like employed heretofore for shaping or profiling a workpiece such as a die or the like, a high-frequency electrical spark is discharged from a metal tool serving as a tool electrode to disintegrate electrically conductive materials from a workpiece such as of hardened steel or the like. The tool electrode and the workpiece are immersed in a dielectric liquid (processing liquid), and a feed mechanism maintains a spark gap between the tool electrode and the workpiece. As spark discharges melt the materials of the workpiece, the particles are flushed away, and the tool electrode advances. The process is accurate and is used for machining dies, molds, holes, slots, and/or cavities of almost any desired shape.

In the electric discharge shaping/profiling machine of this type, the tool electrode and the workpiece are immersed in the processing liquid so that the liquid intervenes between the tool electrode and the workpiece. This is for the purpose of suppressing temperature-rise at a location where the electric discharge takes place to thereby prevent occurrence of accident such as misfire due to the discharge spark.

In the course of the electric discharge machining, sludge (i.e., pulverized materials or particulates) is produced from a surface of the workpiece being machined. If the sludge should be left as it is, performance of the electric discharge taking place between the tool electrode and the workpiece will be lowered, involving degradation in the precision of machining. For this reason, it is required to remove or discharge the sludge as speedily and timely as possible.

Such being the circumstances, there has heretofore been proposed a jump control apparatus for moving upwardly and downwardly the tool electrode of the electric discharge shaping/profiling machine in succession to the pulse-like electric discharge to thereby remove or discharge the sludge produced during the machining process substantially on a real time basis.

With this type of the jump control apparatus for the electric discharge shaping/profiling machine, when the tool electrode is moved downwardly relative to the surface of the workpiece being machined, the dielectric liquid or processing liquid intervening between the tool electrode and the workpiece is caused to forcibly flow onto the surface of the workpiece being machined, whereby the sludge is caused to be flushed away from the surface of the workpiece being machined.

In this conjunction, it is however noted that in case the jumping velocity of the tool electrode is smaller than the optimal value, the amount of the processing liquid which is displaced from the surface of the workpiece being machined will decrease. As a result of this, when the tool electrode is moved upwardly, the liquid containing the sludge again flows back onto the surface of the workpiece being machined, rendering it difficult or impossible to remove the sludge.

Such being the circumstances, in order to allow the sludge to be removed speedily and effectively, it is required to set optimally the so-called jump conditions (e.g. jump-up quantity and jumping velocity) for the tool electrode by taking into consideration not only the properties of the processing liquid such as viscosity but also mechanical factors (e.g. mechanical strength) of a main spindle employed for driving the tool electrode.

As the hitherto known jump control apparatus for the electric discharge shaping/profiling machine, there may be mentioned those disclosed, for example, in Japanese Patent Application Laid-Open Publication No. 309630/1998 (JP-A-10-309630) and Japanese Patent Application Laid-Open Publication No. 200 1-9642 (JP-A-2001 -9642), respectively.

In the case of the jump control apparatus disclosed in Japanese Patent Application Laid-Open Publication No. 309630/1998, the jump-up quantity is determined on the basis of the area of the workpiece being machined, depth thereof and the like factors, whereon the jumping velocity is automatically set through a fuzzy logic or inference on the basis of the area being machined and the spark gap in precedence to initiation of the jump control.

However, in the case of the jump control apparatus described just above, it is noted that upon setting the jump conditions, no consideration is paid to the change or variation which may occur in the distance (spark gap) between the tool electrode and the workpiece in dependence on the conditions for the electric discharge as well as in the machined-surface length between the machining surface defined at the tip end of the tool electrode (i.e., bottom surface of the tool electrode) and the top surface of the workpiece.

Consequently, when the distance between the tool electrode and the workpiece (i.e., one of the conditions for the electric discharge) is set to be large and/or when the shape or profile resulting from the machining presents a tapered portion and/or a curved surface, it is difficult or impossible to remove the sludge by flushing with the processing liquid.

As a result of this, such situation may arise that the machining process for the workpiece does not proceed speedily and smoothly. Besides, the desired machining precision may not satisfactorily be achieved.

Further, in the jump control apparatus described above, the jump conditions are set or established through the fuzzy logic inference. Consequently, in the case where the tool electrode is of a rib-like form (i.e., when the desired finished shape of the workpiece is of a rib-like form), which means that the area subjected to the machining process is large, the jump-up quantity of the tool electrode may be estimated or inferred to be smaller than the demanded or desired value.

However, for discharging or removing the sludge by flushing with the processing liquid carrying the sludge, a large jump-up quantity is ordinarily demanded. Accordingly, with the small jump-up quantity such as mentioned above, there may arise such unwanted situation that the sludge can not adequately be removed.

On the other hand, in the jump control apparatus for the electric discharge shaping/profiling machine disclosed in Japanese Patent Application Laid-Open Publication No. 2001-9642 (JP-A-2001-9642), the feeding speed for the jump motion of the tool electrode is set to 20 m/min at the lowest, while the tool electrode feeding acceleration/deceleration is set to be not lower than 1.0 G.

In this case, however, since the moving speed of the tool electrode may be set to a value greater than a permissible value, there may take place a region of negative pressure at or along the bottom surface of the tool electrode when it moves upwardly, as a result of which mechanical damage and degradation of the machining precision may unwantedly occur due to deformation of the main spindle, giving rise to a problem.

It is further noted that in the apparatus disclosed in both the publications cited above, a feed-back control system is adopted for controlling optimally the jump conditions stepwise progressively in the course of the machining process. As a consequence, a lot of time is required for validating actually the optimal values for the jump conditions for removing the sludge, which may ultimately incur degradation of the machining precision, to another disadvantage.

As will now be appreciated from the foregoing, with the hitherto known or conventional jump control apparatus for electric discharge shaping/profiling machines such as a die sinking electric discharge machine or the like, no consideration is given to the important working or machining conditions upon setting the jump conditions for the removal of the sludge. Besides, the jump conditions are put into effect by making use of feed-back control. Consequently, it is difficult or even impossible to optimize the jump conditions speedily and timely in the course of the machining process, giving rise to a problem that the desired machining precision cannot be satisfactorily achieved.

SUMMARY OF THE INVENTION

In the light of the state of the art described above, it is an object of the present invention to provide a jump control apparatus for an electric discharge shaping/profiling machine such as a die sinking electric discharge machine, which apparatus can evade from the drawbacks and problems of the conventional apparatuses such as mentioned above and which apparatus allows the machining precision to be significantly improved or enhanced while ensuring remarkable reduction of the machining or processing time by removing the sludge speedily and satisfactorily regardless of differences in the shape or profile among the workpieces subjected to the machining process by adopting a feed-forward control for setting the jump conditions in precedence to execution of the machining process.

A second object of the present invention is to provide a jump control apparatus for an electric discharge shaping/profiling machine such as a die sinking electric discharge machine, which is capable of reducing the process or machining time while improving the machining precision notwithstanding of differences in shape among workpieces subjected to the processing by inferring or estimating the jump conditions on the basis of the working or machining conditions which play important roles in determining the jump conditions.

In view of the above and other objects which will become apparent as the description proceeds, there is provided according to a first aspect of the present invention a jump control apparatus for an electric discharge shaping/profiling machine designed for machining a workpiece by applying a pulse-like voltage across a tool electrode mounted on a main spindle at one end thereof and the workpiece disposed in opposition to the tool electrode with a processing liquid intervening therebetween. The apparatus includes a feed control unit for controlling a feed quantity of the main spindle to thereby control a vertical position of the tool electrode relative to the workpiece, a jump condition estimating unit for estimating jump conditions for effectuating jump motion of the tool electrode with a view to discharging sludge taking place between the tool electrode and the workpiece in the course of machining process performed for the workpiece, the jump conditions as generated being then inputted to the feed control unit, an input unit for allowing machining conditions bearing relation to the jump conditions to be inputted in precedence to machining process to be performed for the workpiece, and a numerical control unit for determining arithmetically various parameters in dependence on the machining conditions to thereby input the various parameters as determined to the jump condition estimating unit. In the apparatus described above, the jump condition estimating unit is so designed as to estimate the jump conditions on the basis of a feed-forward control effectuated by making use of the various parameters mentioned above.

According to a second aspect of the invention, there is provided a jump control apparatus for an electric discharge shaping/profiling machine designed for machining a workpiece by applying a pulse-like voltage across a tool electrode mounted on a main spindle at one end thereof and the workpiece disposed in opposition to the tool electrode with a processing liquid intervening therebetween. The apparatus includes a feed control unit for controlling a feed quantity of the main spindle to thereby control a vertical position of the tool electrode relative to the workpiece, a jump condition estimating unit for estimating jump conditions for effectuating jump motion of the tool electrode with a view to discharging sludge taking place between the tool electrode and the workpiece in the course of machining process performed for the workpiece, the jump conditions as generated being then inputted to the feed control unit, an input unit for allowing machining conditions bearing relation to the jump conditions to be inputted in precedence to machining process to be performed for the workpiece, and a numerical control unit for determining arithmetically various parameters in dependence on the machining conditions to thereby input the various parameters as determined to the jump condition estimating unit. In the apparatus described above, the jump condition estimating unit is so designed as to estimate the jump conditions on the basis of the various parameters in precedence to machining of the workpiece.

According to a third aspect of the invention, there is provided a jump control apparatus for an electric discharge shaping/profiling machine designed for machining a workpiece by applying a pulse-like voltage across a tool electrode mounted on a main spindle at one end thereof and the workpiece disposed in opposition to the tool electrode with a processing liquid intervening therebetween. The apparatus includes a feed control unit for controlling a feed quantity of the main spindle to thereby control a vertical position of the tool electrode relative to the workpiece, a jump condition estimating unit for estimating jump conditions for effectuating jump motion of the tool electrode with a view to discharging sludge taking place between the tool electrode and the workpiece in the course of machining process performed for the workpiece, the jump conditions as generated being then inputted to the feed control unit, an input unit for allowing machining conditions bearing relation to the jump conditions to be inputted in precedence to machining process to be performed for the workpiece, and a numerical control unit for determining arithmetically various parameters in dependence on the machining conditions to thereby input the various parameters as determined to the jump condition estimating unit. In the apparatus described above, the jump condition estimating unit is so designed as to determine desired values for the jump conditions through inference on the basis of the various parameters upon starting of machining of the workpiece.

In a preferred mode for carrying out the invention, the jump control apparatus for the electric discharge shaping/profiling machine may further include a machining stage detecting means for detecting a machining stage or status of the workpiece on the basis of a moving quantity of the main spindle. The machining conditions contain a plurality of preset values which differ in dependence on the machining stages. In this case, the numerical control unit may be so designed as to arithmetically determine the various parameters mentioned previously on the basis of the machining conditions corresponding to the machining stages or statuses, respectively.

In another preferred mode for carrying out the invention, the various parameters may include shape information of the tool electrode. In that case, the jump condition estimating unit may be comprised of a jump-up quantity estimating module designed for estimating a jump-up quantity of the tool electrode, and a jumping velocity estimating module designed for estimating a jumping velocity of the tool electrode.

In yet another preferred mode for carrying out the invention, the various parameters may include a spark gap between the tool electrode and the workpiece arithmetically determined on the basis of the machining conditions for the workpiece, and a machined-surface length extending from a machined surface being machined at a tip end of the tool electrode to a top surface of the workpiece. In this case, the jump-up quantity estimating module may be so designed as to estimate an optimal jump-up quantity for the tool electrode on the basis of the shape information of the tool electrode, the spark gap and the machined-surface length.

In still another preferred mode for carrying out the invention, the various parameters may include kinematic viscosity of the processing liquid. In this case, the jumping velocity estimating module may be so designed as to estimate the jumping velocity of the tool electrode required at a minimum on the basis of the kinematic viscosity of the processing liquid.

In still another preferred mode for carrying out the invention, the various parameters may include a spark gap between the tool electrode and the workpiece, a machined-surface length extending from a machined surface being machined at a tip end of the tool electrode to a top surface of the workpiece, an outer peripheral length of the tool electrode at the top surface of the workpiece, a machining area defined at the tip end of the tool electrode, kinematic viscosity of the processing liquid, and a constant indicating a ratio between an inertia force and a viscous force of the processing liquid. The above-mentioned constant may be set to a value greater than "10" in dependence on the jumping velocity of the tool electrode which is estimated by the jumping velocity estimating module. In that case, the jump-up quantity estimating module may be so designed as to estimate arithmetically an optimum jump-up quantity for the tool electrode on the basis of the various parameters in accordance with expression $ju = d \cdot h \cdot L/S$. On the other hand, the jumping velocity estimating module may be so designed as to estimate arithmetically the jumping velocity of the tool electrode required at a minimum on the basis of the various parameters in accordance with expression $jmp = Re \cdot L \cdot n/S$.

In a further preferred mode for carrying out the invention, the various parameters may include a spark gap between the tool electrode and the workpiece, a machined-surface length extending from the machined surface being machined at a tip end of the tool electrode to a top surface of the workpiece, an outer peripheral length of the tool electrode at the top surface of the workpiece, a tip end width of the tool electrode, kinematic viscosity of the processing liquid, and a constant indicating a ratio between an inertia force and a viscous force of the processing liquid. The above-mentioned constant may be set to a value greater than "10" in dependence on the jumping velocity of the tool electrode which is estimated by the jumping velocity estimating module. In the case where the tool electrode is of a rib-like shape, the jump-up quantity estimating module may be so designed as to estimate arithmetically an optimum jump-up quantity for the tool electrode on the basis of the various parameters in accordance with expression $ju = 2d \cdot h/w$, while the jumping velocity estimating module may be so designed as to estimate arithmetically the jumping velocity of the tool electrode required at a minimum on the basis of the various parameters in accordance with expression $jmp = 2Re \cdot n/w$.

By virtue of the arrangements described above, the machining precision can be significantly improved with the machining time being remarkably shortened because the sludge produced in the course of the machining process can be discharged or removed speedily and timely in a satisfactory manner regardless of differences in the shape among the workpieces subjected to the machining process.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
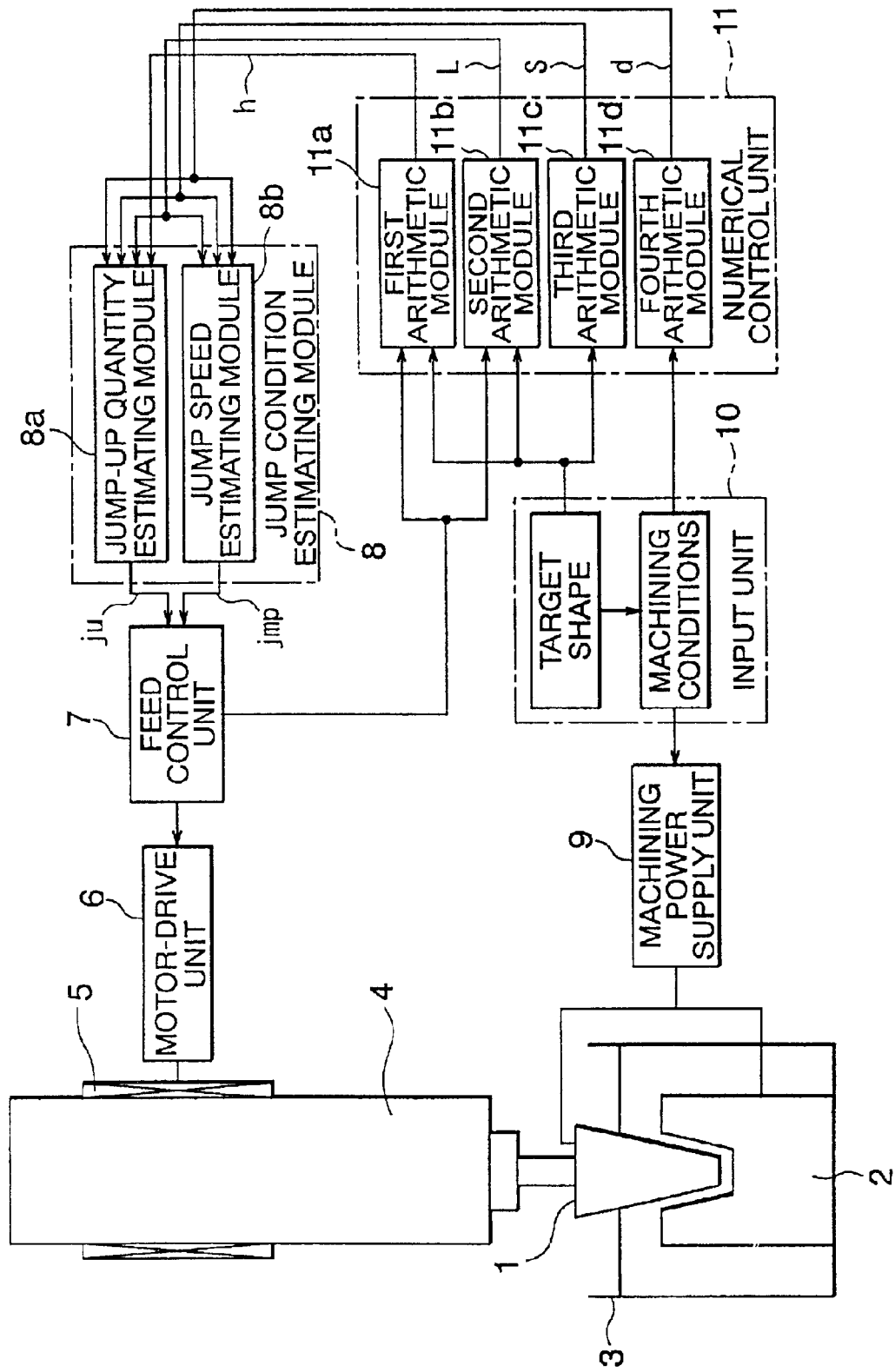
FIG. 1 is a block diagram showing generally and schematically a structure of a jump control apparatus for an electric discharge shaping/profiling machine according to a first embodiment of the present invention.

The present invention will be described in detail in conjunction with what is presently considered as preferred or typical embodiments thereof by reference to the drawings. In the following description, like reference characters designate like or corresponding parts throughout the several views. At this juncture, it should be mentioned that with the phrase "electric discharge shaping/profiling machine" used herein, it is intended to cover conceptionally not only the die sinking electric discharge machine but also machines for electron discharge method (EOM), electrical discharge machining, electric spark machining, electrospark machining and the like.

Embodiment 1

FIG. 1 is a block diagram showing generally and schematically a structure of a jump control apparatus for an electric discharge shaping/profiling machine according to a first embodiment of the present invention. The electric discharge shaping/profiling machine may also be referred to as the die sinking electric discharge machine.

Referring to FIG. 1, a tool electrode 1 is disposed in opposition to a workpiece 2 which is positioned within a processing liquid vessel 3 filled with a processing liquid such as a dielectric solution in such state that the machined surface (the surface of the workpiece to be machined or processed) of the workpiece 2 is covered with the processing liquid.

The tool electrode 1 is fixedly secured to a main spindle 4 at one end thereof and adapted to be driven in a Z-axis direction (vertical direction). The main spindle 4 is operatively coupled to an electric motor 5 which is driven by a motor drive unit 6 which in turn is controlled by a feed control unit 7. A jump condition predicting or estimating unit 8 is provided in association with the feed control unit 7. More specifically, the feed control unit 7 is designed to control the feed quantity of the main spindle 4 through the medium of the motor drive unit 6 to thereby control the vertical position of the tool electrode 1 relative to the workpiece 2.

The jump condition estimating unit 8 is comprised of a jump-up quantity estimating module 8a designed for inferring or estimating a jump-up quantity ju and a jumping velocity estimating module 8b designed for inferring or estimating a jumping velocity jmp, to thereby infer or estimate arithmetically the jump-up quantity ju and the jumping velocity jmp as the jump conditions for the tool electrode on the basis of various parameters (described hereinafter).

More specifically, in order to remove the sludge produced between the tool electrode 1 and the workpiece 2 in the course of machining of the workpiece 2, the jump condition estimating unit 8 determines and generates the jump conditions for effectuating jump motion of the tool electrode 1. The jump conditions as generated are then putted to the feed control unit 7.

A power supply unit for machining (or machining power supply unit) designated by numeral 9 is adapted to apply a machining pulse-like DC voltage between the tool electrode 1 mounted on the main spindle 4 at one end thereof and the workpiece 2 which is disposed in opposition to the tool electrode 1 with the processing liquid such as a dielectric solution intervening therebetween.

An input unit 10 to which various data are inputted through manipulation of a user is designed to set various machining conditions in accordance with the data determined by the user in precedence to the machining process (e.g. shape of the tool electrode 1 and hence the shape of the workpiece 2 to be machined, kinematic viscosity n of the processing liquid and the like) and serves for inputting the various machining conditions which bear relation to the jump conditions into the machining power supply unit 9 and a numerical control unit 11.

The numerical control unit 11 incorporating arithmetic modules described hereinafter is designed to arithmetically determine parameters required for the jump prediction or estimation on the basis of the data inputted by the user (machining conditions including the shape of the workpiece to be machined) and the control quantities (machining statuses in the course of machining process) for the feed control unit 7, the parameters as determined being then inputted to the jump condition estimating unit 8.

The feed control unit 7 is imparted with a function serving as a machining stage detecting means and designed to detect the machining stage of the workpiece 2 on the basis of the control quantity (moving quantity or displacement of the main spindle 4).

The machining conditions inputted previously to the input unit 10 contain a plurality of preset value which differ in dependence on the machining stages.

The numerical control unit 11 may be comprised of e.g. first to fourth arithmetic modules 11a to 11d so as to be capable of arithmetically determining the various parameters required for estimation of the jump conditions on the basis of the appropriate or proper machining conditions conforming to the individual machining stages, respectively.

More specifically, the first arithmetic module 11a is designed to arithmetically determine a machined-surface length h which extends from a machined surface being machined at a tip end of the tool electrode 1 to a top surface of the workpiece 2 on the basis of the target shape to be machined and the machining state or status, while the second arithmetic module 11b is designed to arithmetically determine the outer peripheral length L of the tool electrode 1 at the top surface of the workpiece 2 on the basis of the target shape and the machining state or status.

Incidentally, the machined-surface length h, represents the distance along the machined surface of the workpiece in the Z-axis direction. This distance may assume different values in dependence on the target machined shape (presence/absence of a tapered portion and/or a curved surface) even when the depth to the machined surface of the workpiece located at the tip end of the tool electrode is same.

Similarly, the third arithmetic module 11c is so designed as to arithmetically determine a machining area S on the tip end of the tool electrode 1 on the basis of the target shape to be machined and the machining status, while the fourth arithmetic module 1id is designed to arithmetically determine the spark gap d intervening between the tool electrode 1 and the workpiece 2 on the basis of the machining conditions.

On the other hand, the jump condition estimating unit 8 is so designed as to infer or estimate the jump conditions on the basis of the feed-forward control which is effectuated by making use of the various parameters in precedence to the machining process of the workpiece 2.

In this way, the jump condition estimating unit 8 is capable of generating the jump conditions in terms of the target or desired values upon starting of the electric discharge machining of the workpiece 2.

By way of example, the jump-up quantity estimating module 8a can be so implemented as to estimate the optimal jump-up quantity ju of the tool electrode 1 on the basis of the shape information of the tool electrode 1, the spark gap d and the machined-surface length h.

At this juncture, it is to be added that by determining the jump conditions on the basis of the map data corresponding to the parameter values, the jump conditions (data values) estimated in advance can be generated within a further reduced time.

Figure 2:
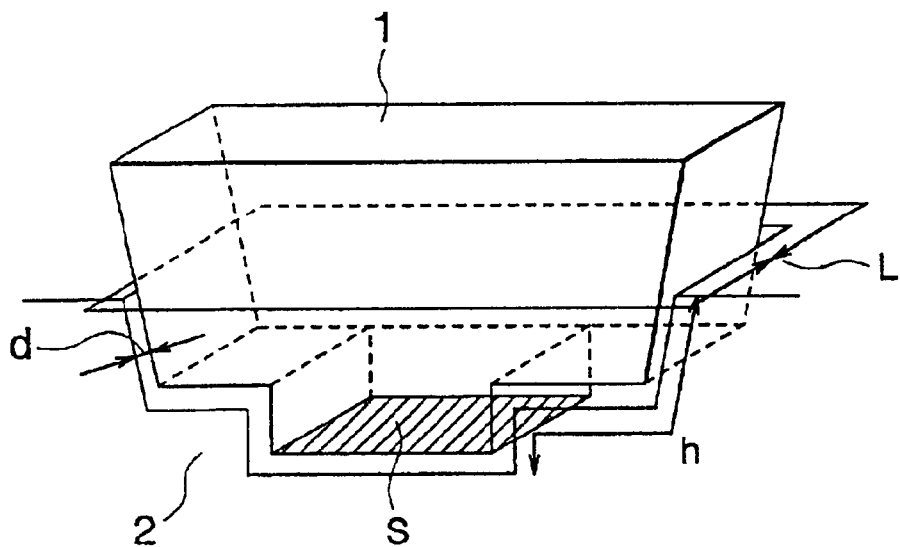
FIG. 2 is an enlarged perspective view showing an opposite disposition of a tool electrode and a workpiece.

FIG. 2 is an enlarged perspective view showing an opposite disposition of the tool electrode 1 and the workpiece 2 and indicates geometrical parameters for machining as employed in the jump condition estimating unit 8.

In this figure, both the tool electrode 1 and the workpiece 2 are shown in the state in which the processing or machining of the workpiece 2 has made a progress to a certain extent. It is presumed that a tip-end boss portion and a trapezoidally tapered portion of the tool electrode 1 are placed or inserted into the workpiece 2.

More specifically, in FIG. 2, there are shown the machined-surface length h, extending from the machined surface of the workpiece 2 located adjacent to the tip end of the tool electrode 1 to the top surface of the workpiece 2, the outer peripheral length L of the tool electrode 1 at the top surface of the workpiece 2, the machining area S defined at the tip end of the tool electrode 1 and the spark gap d intervening between the tool electrode 1 and the workpiece 2.

In operation, the numerical control unit 11 arithmetically determines the machining area S of the tip end of the tool electrode 1 on the basis of the target shape to be machined while determining arithmetically the machined-surface length h and the outer peripheral length L of the tool electrode 1 in correspondence to the target shape for machining and the feed quantity of the main spindle 4. Additionally, the numerical control unit 11 arithmetically determines the spark gap d on the basis of the machining conditions.

Incidentally, when the machining conditions are modified or altered in the course of machining process, the numerical control unit 11 determines again the spark gap d corresponding to the value after the change.

Further, when the machining stage makes progress to such extent that the tapered portion of the tool electrode 1 is partially inserted into or placed within the workpiece 2, as is illustrated in FIG. 2, the numerical control unit 11 again determines arithmetically the machined-surface length h corresponding to the machining stage concerned.

When the data values (various parameters) have been arithmetically determined by the numerical control unit 11, the various data values are then sent to the jump condition estimating unit 8 for estimating the jump-up quantity which is required for removing or discharging the sludge.

Description will now be made below concerning rules A1 to A4 which are executed by the jump-up quantity estimating module 8a incorporated in the jump condition estimating unit 8 on the presumption that only the parameters which are concerned change.

In this conjunction, it is presumed that the parameters mentioned below are made use of for determining the jump-up quantity ju in the jump-up quantity estimating module 8a.

h: machined-surface length extending from the machined surface at the tip end of the tool electrode to the top surface of the workpiece.
L: outer peripheral length of the tool electrode at the top surface of the workpiece.
d: spark gap between the tool electrode and the workpiece.
S: machining area on the tip end surface of the tool electrode.

Rule A1: Concerning the Machined-Surface Length h

As the machined-surface length h increases, the jump-up quantity ju is increased.

As the machined-surface length h decreases, the jump-up quantity ju is decreased.

Rule A2: Concerning the Outer Peripheral Length L of the Tool Electrode 1

As the outer peripheral length L increases, the jump-up quantity ju is increased.

As the outer peripheral length L deceases, the jump-up quantity ju is decreased.

Rule A3: Concerning the Spark Gap d

As the spark gap d increases, the jump-up quantity ju is increased.

As the spark gap d decreases, the jump-up quantity ju is decreased.

Rule A4: Concerning the Machining Area S

As the machining area S increases, the jump-up quantity ju is decreased.

As the machining area S decreases, the jump-up quantity ju is increased.

When the jump-up quantity ju is determined in this manner, a command indicating the jump-up quantity ju (i.e., control quantity) is sent to the feed control unit 7 which responds thereto by driving the motor drive unit 6 to thereby effect the jump motion of the main spindle 4.

Figure 3:
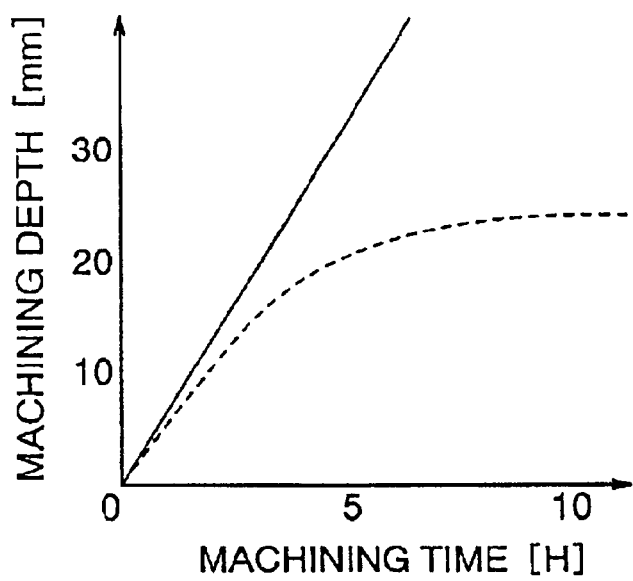
FIG. 3 is a characteristic diagram for graphically illustrating a relation between machining time (hour) and machining depth (mm) upon jump control in the electric discharge shaping/profiling machine according to the first embodiment of the invention compared with that of a conventional apparatus.

FIG. 3 is a characteristic diagram which graphically illustrates a relation between the machining time (hour) and the machining depth (mm) when the jump control is validated in the electric discharge shaping/profiling machine according to the first embodiment of the invention.

As can be seen in FIG. 3, in the case of a hitherto known apparatus, machining depth on the order of 20 mm can be realized after lapse of the machining time of five hours (refer to a phantom like curve). By contrast, in the case of the apparatus according to the first embodiment of the present invention, the machining depth on the order of 30 mm can be realized with the machining process of five hours (see a solid line curve).

As is apparent from the above, in the case of the conventional apparatus, a relatively long time is taken for the machining process because the sludge can not be removed adequately. By contrast, in the case of the apparatus according to the first embodiment of the invention, the shape and the precision after the machining process are estimated or predicted on the basis of the geometrical data of the tool electrode 1 in precedence to the machining process to thereby determine the jump conditions in view of the portions or locations where the sludge is rather difficult to remove (e.g. the machined surface portions of the workpiece facing in opposition to the tip end portion and the offset portions of the side wall of the tool electrode), whereby the sludge produced at the location where the electric discharge takes place can be removed rapidly and satisfactorily.

Thus, the optimal jump conditions can be estimated or predicated regardless of difference in the target shape for machining among the workpiece 2, whereby the machining time can be shortened, as can clearly be seen by comparing the solid line characteristic curve with the phantom line curve shown in FIG. 3.

Besides, the processing or machining precision can be enhanced in addition to the reduction of the machining time.

Figure 4:
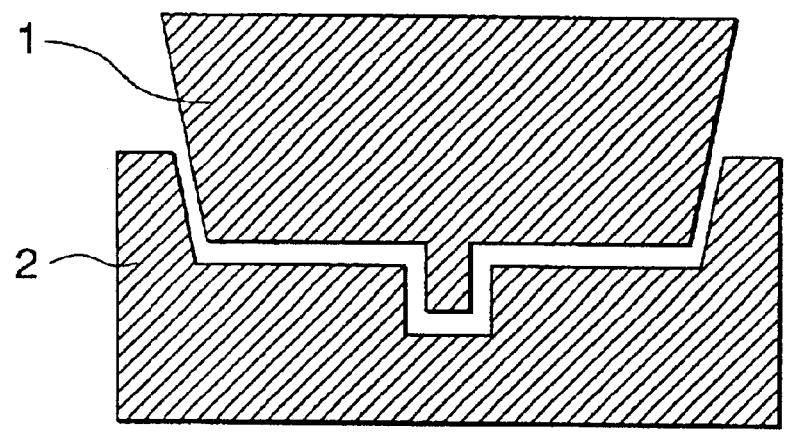
FIG. 4 is a vertical sectional view of a tool electrode and a workpiece.

FIG. 4 is a vertical sectional view of the tool electrode 1 and the workpiece 2 for illustrating the shape of the former and the machined shape of the latter.

Referring to FIG. 4, in the case of the conventional apparatus, sludge tends to remain stuck to the peripheral surface of the tool electrode 1 because of poor or insufficient removal of the sludge, giving rise to occurrence of a secondary electric discharge. As a result of this, small curved portions make appearance on the machined or processed peripheral surface of the workpiece, incurring degradation of the machining precision.

By contrast, in the case of the electric discharge shaping/profiling machine equipped with the jump control apparatus according to the first embodiment of the present invention, the sludge can be removed timely and speedily with high reliability, as a result of which occurrence of the secondary electric discharge on the side wall of the tool electrode and hence the instable machining state can positively be avoided. Thus, the time taken for machining the workpiece 2 can be shortened with the machining precision being significantly enhanced.

Embodiment 2

In the case of the jump control apparatus for the electric discharge shaping/profiling machine according to the first embodiment of the invention, essentially no attention has been paid to the kinematic viscosity n of the processing liquid existing between the tool electrode 1 and the workpiece 2. However, the jump condition estimating unit 8 can be so designed as to estimate or predict the jumping velocity jmp required at a minimum by making use of the kinematic viscosity n of the processing liquid in addition to the parameters mentioned previously.

In the jump control apparatus for the electric discharge shaping/profiling machine according to the second embodiment of the present invention, the jump condition estimating unit 8 (see FIG. 1) is designed to estimate the jump-up quantity ju and the jumping velocity jmp required at a minimum on the basis of the spark gap d between the tool electrode 1 and the workpiece 2, the kinematic viscosity n of the processing liquid, the geometrical data (machined-surface length h of the workpiece and the outer peripheral length L of the tool electrode) which prescribe the machining conditions.

In that case, when the various parameters are obtained from the numerical control unit 11, the jump condition estimating unit 8 infers or estimates the jump-up quantity ju mentioned previously on the basis of the available various parameters while estimating the jumping velocity jmp required for removing or discharging the sludge on the basis of the kinematic viscosity n of the processing liquid.

In the following, description will be made concerning rules B1 and B2 executed by the jump condition estimating unit 8 incorporated in the jump control apparatus according to the second embodiment of the present invention on the presumption that only the parameters which are concerned change.

In this conjunction, it is further presumed that the parameters mentioned below are employed for determining the jump-up quantity ju and the jumping velocity jmp in the jump-up quantity estimating module 8a and the jumping velocity estimating module 8b.

L: outer peripheral length of the tool electrode at the top surface of the workpiece.
S: machining area on the tip end of the tool electrode.
n: kinematic viscosity of the processing liquid.

Rule B1: Concerning the Outer Peripheral Length of the Tool Electrode

As the outer peripheral length L of the tool electrode increases, the jump-up quantity ju is increased with the jumping velocity jmp being increased.

As the outer peripheral length L of the tool electrode decreases, the jump-up quantity ju is decreased with the jumping velocity jmp being also decreased.

Rule B2: Concerning the Machining Area S

As the machining area S increases, the jump-up quantity ju is decreased with the jumping velocity jmp being also decreased.

As the machining area S decreases, the jump-up quantity ju is increased while the jumping velocity jmp is increased.

Rule B3: Concerning the Kinematic Viscosity n

As the kinematic viscosity n, increases, the jumping velocity jmp is increased.

As the kinematic viscosity n decreases, the jumping velocity jmp is decreased.

When the jump-up quantity ju and the jumping velocity jmp are determined in this manner, a corresponding command (control quantity) is sent to the feed control unit 7 which responds thereto by driving the motor drive unit 6 to thereby effectuate the jump motion of the main spindle 4.

In general, when the jumping velocity jmp is set to an excessively large value, a pressure lower than the atmospheric pressure (i.e., negative pressure) is generated in the region defined between the tool electrode 1 and the workpiece 2, whereby the dielectric solution is vaporized. In other words, a so-called "cavitation" phenomenon) takes place.

When bubbles are generated due to the vaporization of the processing liquid in this way, the sludge discharge efficiency becomes lowered.

Further, the region of negative pressure mentioned above exerts a force of large magnitude which exceeds a permissible limit onto the workpiece 2, which may unwantedly result in deformation of the main spindle 4.

On the other hand, when the jumping velocity jmp is set to an excessively small value, the sludge displaced from the portion being machined will not satisfactorily be flushed away in the radial direction upon sinking of the tool electrode 1. As a result of this, the sludge is caused to be fed back again to the portion being machined upon lifting of the tool electrode 1. In other words, a reverse flow phenomenon of the processing liquid carrying the sludge can taken place.

By contrast, in the jump control apparatus for the electric discharge shaping/profiling machine according to the second embodiment of the present invention, the jumping velocity jmp which is required at the least can be predicted, whereby the reverse flow phenomenon of the processing liquid carrying the sludge can positively be suppressed. To say in another way, according to the teachings of the invention incarnated in the second embodiment, the sludge can be removed more positively and speedily, whereby the instable machining process or state can be avoided with high reliability.

Thus, the shaping precision can be much enhanced in addition to significant reduction of the machining time.

Besides, by suppressing to the minimum the appearance of the negative-pressure region between the tool electrode 1 and the workpiece 2 during the jump motion, the sludge can be flushed away more effectively. Thus, degradation of the machining precision due to deformation of the main spindle 4 can be suppressed in addition to the effective reduction of the machining time.

Embodiment 3

In the jump control apparatus for the electric discharge shaping/profiling machine according to the second embodiment of the invention described above, the method of arithmetically determining or calculating the jump-up quantity ju has not been disclosed in the concrete. In this conjunction, it should be added that the jump-up quantity ju may be calculated in accordance with an expression containing the machined-surface length h, the outer peripheral length L of the tool electrode, the machining area S and the spark gap d.

Similarly, the jumping velocity jmp can equally be calculated in accordance with an expression which is based on the spark gap d, the outer peripheral length L of the tool electrode, the machining area S, the kinematic viscosity n of the processing liquid and a dimensionless constant (Reynolds number equal to the density of a fluid, times its velocity, times a characteristic length, divided by the fluid velocity)) Re, although not described in concrete in conjunction with the second embodiment of the invention.

In this case, the various parameters include the dimensionless constant (Reynolds number) Re indicating the ratio between the inertia force and the viscous force of the processing liquid as defined above.

At this juncture, it is noted that the constant Re is in proportion to the jumping velocity jmp. Accordingly, it is presumed that the constant Re is set to a value greater than "10" (ten) by setting the jumping velocity jmp to a relatively large value in the jumping velocity estimating module 8b.

In the first place, the jump-up quantity estimating module 8a incorporated in the jump condition estimating unit 8 calculates (i.e., estimates arithmetically) the optimum jump-up quantity ju of the tool electrode 1 in accordance with the undermentioned expression (1) which is realized on the basis of the outer peripheral length L of the tool electrode at the top surface of the workpiece, the machining area S defined at the tip end of the tool electrode and the spark gap d in conformance with the rules A1 to A4 mentioned previously.

$$ju = d \cdot h \cdot L/S \qquad (1)$$

The jump-up quantity ju determined from the above-mentioned expression (1) represents the value required for the processing liquid resident at a location of the tool electrode 1 difficult to displace immediately before the jump motion to reach the top surface of the workpiece 2 through the jump motion.

In addition, the jumping velocity estimating module 8b incorporated in the jump condition estimating unit 8 calculates (or estimate arithmetically) the jumping velocity jmp of the tool electrode 1 required at the least in accordance with the undermentioned expression (2) based on the spark gap d between the tool electrode 1 and the workpiece 2, the outer peripheral length L of the tool electrode at the top surface of the workpiece, the machining area S defined at the tip end of the tool electrode, the kinematic viscosity n of the processing liquid and the constant (Reynolds number) Re not smaller than "10".

$$jmp = Re \cdot L \cdot n/S \qquad (2)$$

The above expression (2) can be derived by modifying the expression concerning the dimensionless constant Re (inertia force/viscous force of the processing liquid) represented by the flow velocity of the processing liquid discharged from the spark gap d between the tool electrode 1 and the workpiece 2, the kinematic viscosity n of the processing liquid and the typical dimensions in respect to the jumping velocity jmp.

Figure 5:
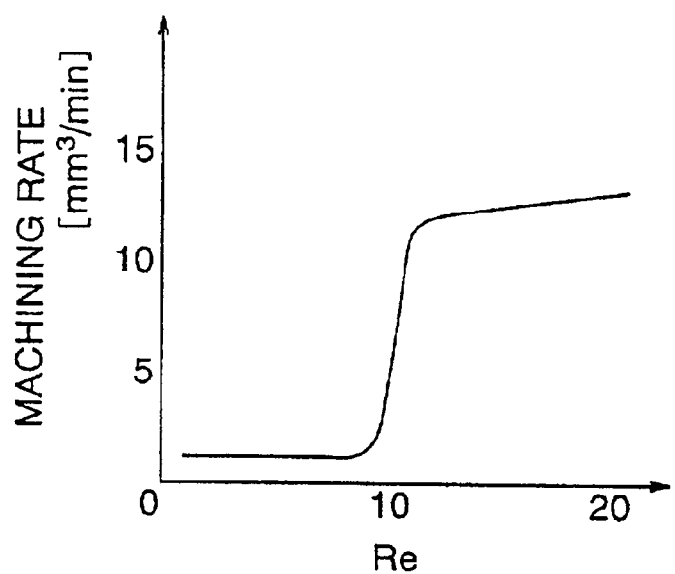
FIG. 5 is a characteristic diagram for illustrating graphically a relation between a constant Re and a machining rate in the apparatus according to a second embodiment of the present invention.

FIG. 5 is a characteristic diagram illustrating graphically a relation between the constant Re and the machining rate ($mm^3$/min). As can be seen in the figure, in the region where the value of the constant Re is smaller than "10" inclusive, the machining rate decreases because of increasing influence of the viscous force of the processing liquid.

This can be explained by the fact that as the influence of the viscous force increases in the region where $Re \leq 10$, the processing liquid containing the sludge resident between the electrodes, i.e., the tool electrode 1 and the workpiece 2, is caused to flow onto the top surface of the workpiece 2, whereas the processing liquid containing the sludge existing in the vicinity of the portion being machined remains close to that portion, as a result of which the sludge flows reversely between the electrodes (1 and 2) upon succeeding jumping movement. Consequently, the sludge remains to be discharged between the tool electrodes, making instable the machining process.

On the other hand, in the region where the constant Re is greater than "10", the machining rate increases because of increasing influence of the inertia force of the processing liquid.

As the influence of the inertia force increases in the region where $Re > 10$, the sludge is flushed from the portion being machined by the jump motion, which contributes enhanced stabilization of the machining process.

It is possible to estimate both the optimal jump-up quantity ju and the jumping velocity jmp in any given machining stages from the expressions (1) and (2) mentioned previously.

Figure 6:
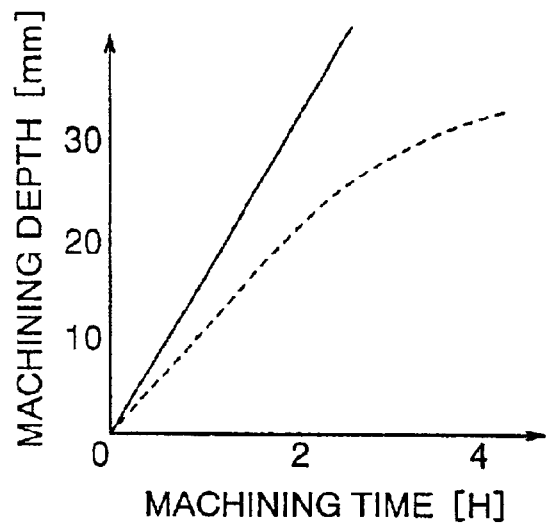
FIG. 6 is a view for graphically illustrating a relation between a machining depth and a machining time in the apparatus according to a third embodiment of the present invention while comparing with that of the conventional apparatus.

FIG. 6 is a characteristic diagram for graphically illustrating a relation between the machining time (hour) and the machining depth (mm) in the course of the jump control carried out by the jump control apparatus for the electric discharge shaping/profiling machine according to the third embodiment of the present invention.

As can be seen in FIG. 6, in the case of the conventional electric discharge shaping/profiling machine, the depth attained after the processing for two hours is on the order of 20 mm (see broken line curves). By contrast, in the case of the electric discharge shaping/profiling machine according to the instant embodiment of the invention, the depth on the order of 30 mm can be attained the processing for two hours (see solid line curve).

Figure 7:
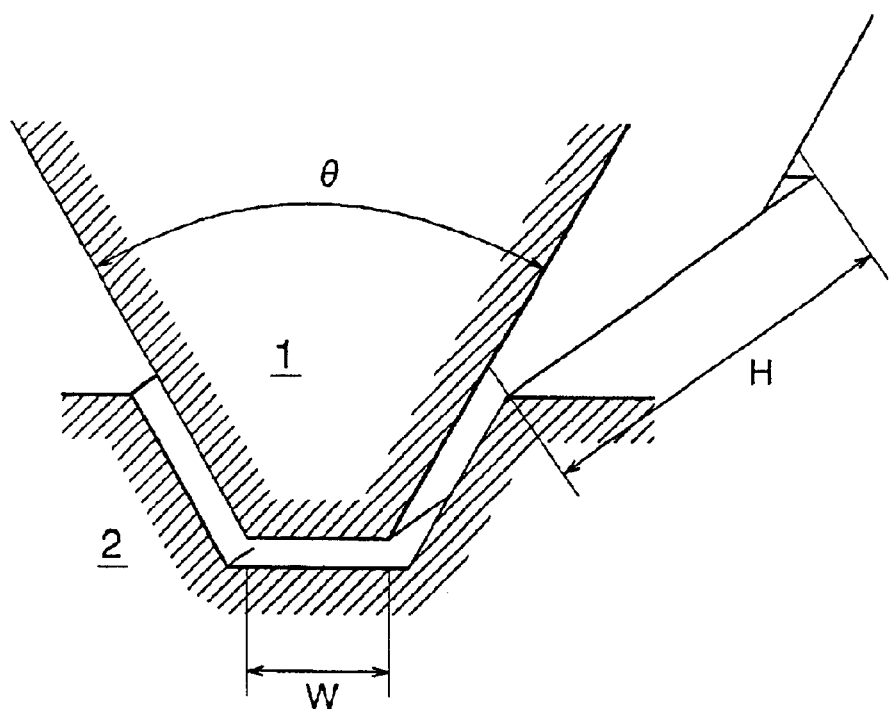
FIG. 7 is an enlarged perspective view showing partially in section a machined shape of a workpiece in the electric discharge shaping/profiling machine in the case where the jump control according to the third embodiment of the present invention is adopted.

FIG. 7 is an enlarged perspective view showing a working shape of a workpiece in a fragmentary sectional view in the case where the jump control scheme according to the third embodiment of the present invention is adopted.

In FIG. 7, it is presumed that the angle $\theta$ of the tip end of the tool electrode is 60 degrees, the tip end width w of the tool electrode is 3 mm and the tip end length H is 60 mm.

In the case of the example mentioned above, the area of the tip end of the tool electrode (i.e., w·H) is as large as 180 mm². In the conventional jump control apparatus, the jump-up quantity ju is set to a relatively small value, which means that the discharge or removal of sludge is not sufficient. As a result of this, a lot of machining or machining time is required.

By contrast, in the case of the jump control apparatus for the electric discharge shaping/profiling machine according to the third embodiment of the present invention, the discharge of the sludge can be effectuated speedily and positively independently from he shape (working shape) of the tool electrode 1, whereby the machining time can be shortened.

Figure 8A:
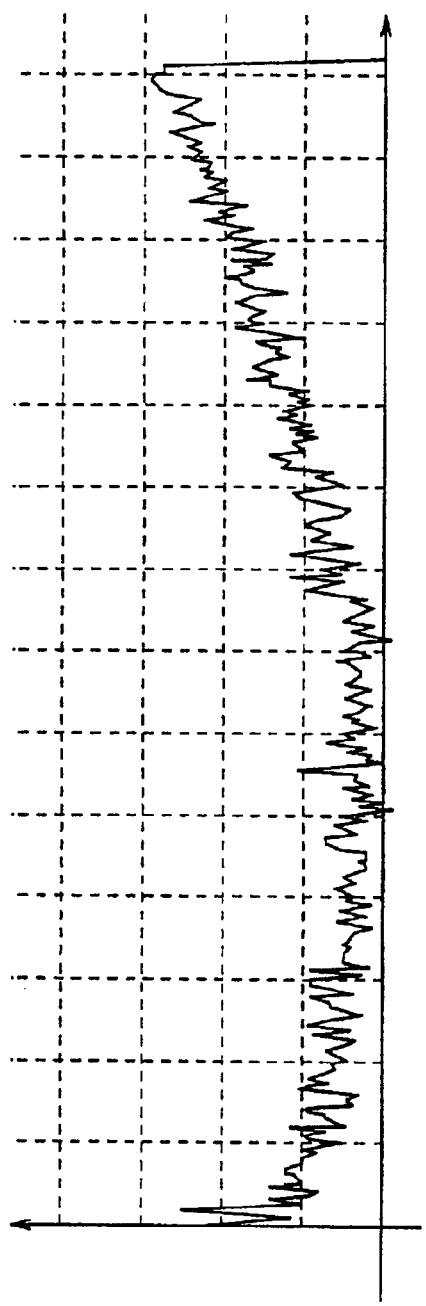
FIG. 8A shows a profile of a machined lateral surface of a workpiece when it is processed by a conventional apparatus.
Figure 8B:
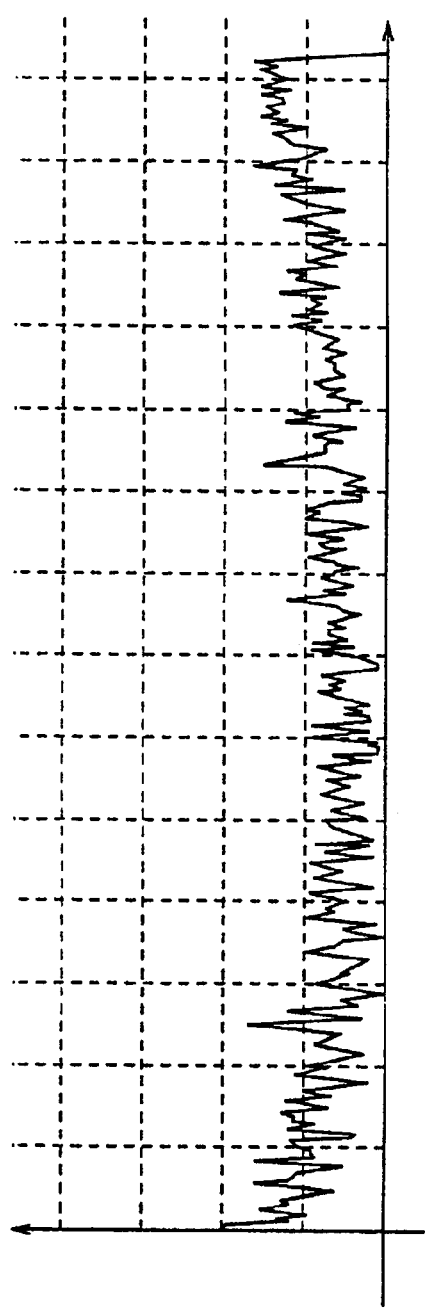
FIG. 8B shows a corresponding profile when the workpiece is processed by an electric discharge shaping/profiling machine according to the third embodiment of the present invention.

FIGS. 8A and 8B are views for graphically illustrating profiles of processed surfaces of workpieces 2 after machining of the lateral surface thereof. In the figures, the machined-surface length h is taken along the abscissa, while positional change or variation of the machined surface of the workpiece 2 is taken along the ordinate.

More specifically, FIG. 8A shows the profile of the machined surface formed when the conventional apparatus is employed, while FIG. 8B shows the same when the apparatus according to the third embodiment of the present invention is employed.

In both the FIGS. 8A and 8B, one division of the scale along the abscissa corresponds to 2 mm while it corresponds to 50 m on the ordinate.

As can be seen in FIG. 8A, the workpiece machined with a conventional apparatus presents significantly curved surface due to poor sludge discharge performance. By contrast, with the apparatus according to the present invention, this curvilinear distortion can significantly be suppressed, as can be seen in FIG. 8B.

As is apparent from the foregoing, according to the teachings of the present invention incarnated in the third embodiment thereof, the jump conditions required for satisfactory sludge discharge can quantitatively be estimated. Besides, the sludge discharge can be effectuated speedily with high reliability, whereby the machining precision can be enhanced, as in the case of the apparatuses according to the preceding embodiments of the invention.

Incidentally, it should be added that the actions and effects equivalent to those mentioned above can of course be obtained even in the case where the tool electrode 1 (or the target shape) is of a rib-like form.

Embodiment 4

In connection with the third embodiment of the invention, no concrete description has been made as to the jump control in the case where the tool electrode 1 (target shape) is of a rib-like shape. However, the tool electrode 1 of a rib-like form can equally be employed in the apparatus according to the present invention. More specifically, in the case where the tool electrode 1 is of a rib-like form (i.e., when the aspect ratio (=H/w) is extremely large), the jump conditions may be determined by approximation.

Figure 9:
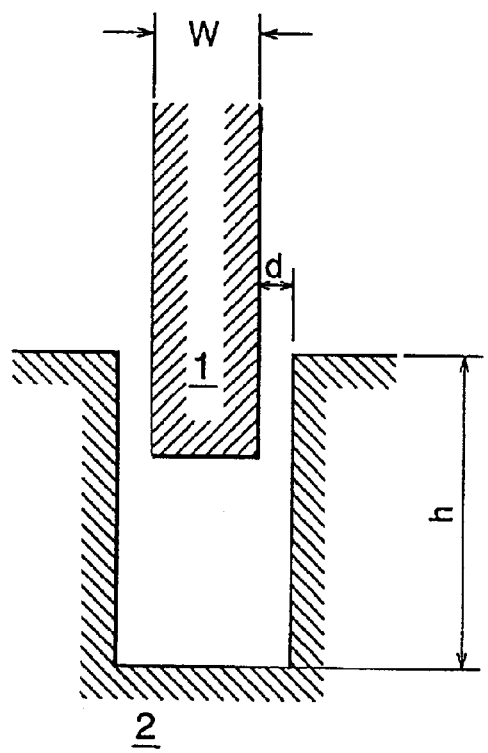
FIG. 9 is an elevational side view showing in a cross section a rib-like tool electrode which is employed in the electric discharge shaping/profiling machine according to a fourth embodiment of the present invention.

FIG. 9 is an elevational side view showing a rib-like form tool electrode 1 which is employed in the electric discharge shaping/profiling machine according to the fourth embodiment of the present invention. It is presumed that the machined-surface length h of the tool electrode 1 (see FIG. 7) is remarkably long as compared with the tip end width w.

In FIG. 9, there are indicated the machined-surface length h, the spark gap d between the tool electrode 1 and the workpiece 2, and the tip end width of the tool electrode 1.

In the electric discharge shaping/profiling machine shown in FIG. 9, the tip end width w of the tool electrode 1 is determined in dependence on the shape of the workpiece to be finished.

Further, the machined-surface length h extending from the machining surface at the tip end of the tool electrode to the top surface of the workpiece is arithmetically determined on the basis of the target shape of the workpiece 2 and the feed quantity of the main spindle 4.

The spark gap d between the tool electrode 1 and the workpiece 2 is arithmetically determined on the basis of the machining conditions.

Incidentally, it should be added that when the machining conditions are changed in the course of the electric discharge machining process, the spark gap d intervening between the tool electrode 1 and the workpiece 2 is computed again in order to take into account the change of the machining conditions.

In that case, the jump condition estimating unit 8 (see FIG. 1) arithmetically determines or computes the optimal jump-up quantity ju in accordance with the under-mentioned expression (3) on the basis of the machined-surface length h extending from the machined surface at the tip end of the tool electrode (or the bottom surface of the tool electrode) to the top surface of the workpiece, the tip end width of the tool electrode 1 and the spark gap d intervening between the tool electrode 1 and the workpiece 2.

$$ju = 2d \cdot h/w \qquad (3)$$

On the other hand, the jump condition estimating unit 8 arithmetically determines or computes the optimal jumping velocity jmp in accordance with the undermentioned expression (4) on the basis of the tip end width w of the tool electrode 1, the kinematic viscosity n of the working liquid, the constant Re (Reynolds number representing the ratio between the inertia force and the viscous force of the processing liquid, as mentioned previously).

$$jmp = 2Re \cdot n/w \qquad (4)$$

In this conjunction, it is presumed that the constant Re appearing in the above-mentioned expression (4) has a value greater than "10" as in the case of the expression (2) mentioned hereinbefore.

As is apparent from the above, the optimal values of the jump-up quantity ju and the jumping velocity jmp in any given process state can be estimated in accordance with the expressions (3) and (4), whereby the control of the electric discharge shaping/profiling machine can further be simplified.

Figure 10:
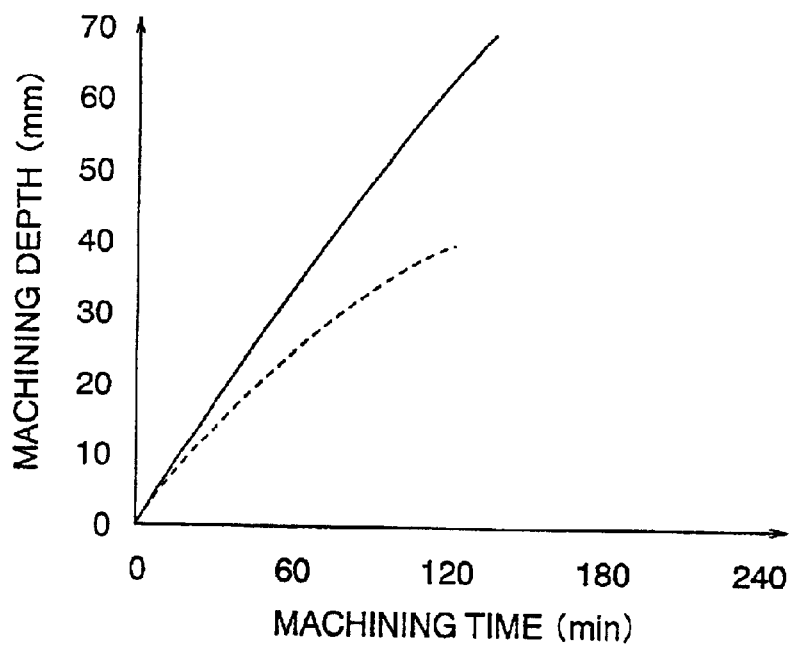
FIG. 10 is a characteristic diagram for graphically illustrating a relation between machining time (hour) and machining depth (mm) in the electric discharge shaping/profiling machine according to the fourth embodiment of the resent invention.

FIG. 10 is a characteristic diagram for graphically illustrating a relation between the machining time (hour) and the machining depth (mm) in the course of the jump control carried out in the electric discharge shaping/profiling machine according to the fourth embodiment of the present invention.

As can be seen in FIG. 10, in the case of the conventional electric discharge shaping/profiling machine, the depth attained by the machining process of 120 minutes (two hours) is on the order of 40 mm (see broken line curves). By contrast, in the case of the electric discharge shaping/profiling machine according to the invention, the depth on the order of 60 mm can be attained the processing for two hours (see solid line curve).

In other words, in the case of the conventional electric discharge shaping/profiling machine, the time taken for machining increases as a function of the machining depth. By contrast, in the electric discharge shaping/profiling machine according to the fourth embodiment of the present invention, sludge can positively be discharged at a high rate nevertheless of increasing of the machining depth through the control conforming to the expressions (3) and (4), whereby the time taken for the electric discharge machining can significantly be reduced.

It should finally be added that the jump conditions can easily be determined in accordance with the much simplified expressions.

EFFECTS OF THE INVENTION

As is apparent from the foregoing, the present invention has provided the jump control apparatus for the electric discharge shaping/profiling machine designed for machining the workpiece by applying the pulse-like voltage across the tool electrode mounted on the main spindle at one end thereof and the workpiece disposed in opposition to the tool electrode with the processing liquid intervening therebetween, which apparatus comprises the feed control unit for controlling the feed quantity of the main spindle to thereby control the vertical position of the tool electrode relative to the workpiece, the jump condition estimating unit for estimating jump conditions for effectuating the jump motion of the tool electrode with a view to discharging the sludge produced between the tool electrode and the workpiece in the course of machining process performed for the workpiece, the jump conditions as generated being then inputted to the feed control unit, the input unit for allowing the machining conditions which bear relation to the jump conditions to be inputted in precedence to the machining process, and the numerical control unit for determining arithmetically various parameters in dependence on the machining conditions to thereby input the various parameters as determined to the jump condition estimating unit.

In the apparatus described above, the jump condition estimating unit is so designed as to estimate the jump conditions on the basis of a feed-forward control effectuated by making use of the various parameters.

Further, in the apparatus of the structure described above, it has been proposed to design the jump condition estimating unit such that the jump conditions are estimated on the basis of the various parameters in precedence to the machining of the workpiece.

Furthermore, in the apparatus of the structure described above, it has been proposed to design the jump condition estimating unit such that desired values for the jump conditions can be determined through inference on the basis of the various parameters upon starting of machining of the workpiece.

By virtue of the arrangements of the apparatuses described above, the machining precision can be significantly improved with the machining time being remarkably shortened because the sludge produced in the course of the machining process can be discharged or removed speedily and timely in a satisfactory manner regardless of differences in the shape among the workpieces subjected to the machining process.

Many modifications and variations of the present invention are possible in the light of the above techniques. It is therefore to be understood that within the scope of the appended claims, the invention may be practiced otherwise than as specifically described.

What is claimed is:

1. A jump control apparatus for an electric discharge shaping/profiling machine for machining a workpiece by applying a pulse voltage across a tool electrode mounted at one end of a main spindle and the workpiece disposed in opposition to the tool electrode with a processing liquid intervening therebetween, the apparatus comprising:

a feed control unit for controlling a feed quantity of a main spindle to control a vertical position of a tool electrode relative to a workpiece;

a jump condition estimating unit for estimating jump conditions for effectuating jump motion of the tool electrode for discharging sludge from between the tool electrode and the workpiece in a machining process performed on the workpiece, the jump conditions estimated being input to said feed control unit;

an input unit for inputting machining conditions considering the jump conditions in precedence to a machining process to be performed on the workpiece; and a numerical control unit for determining, arithmetically, parameters depending on the machining conditions and input to said jump condition estimating unit, wherein said jump condition estimating unit estimates the jump conditions based on a feed-forward control effectuated by using the parameters.

2. The jump control apparatus for an electric discharge shaping/profiling machine according to claim 1, further comprising machining stage detecting means for detecting machining stages of the workpiece based on movement of the main spindle, wherein the machining conditions include a plurality of preset values which differ depending on the machining stages, and said numerical control unit arithmetically determines the parameters based on the machining conditions corresponding to the machining stages, respectively.

3. The jump control apparatus for an electric discharge shaping/profiling machine according to claim 1, wherein the parameters include shape information concerning the tool electrode, and wherein said jump condition estimating unit includes:

a jump-up quantity estimating module estimating jump-up quantity of the tool electrode; and a jumping velocity estimating module estimating jumping velocity of the tool electrode.

4. The jump control apparatus for an electric discharge shaping/profiling machine according to claim 3, wherein the parameters include:

a spark gap between the tool electrode and the workpiece, arithmetically determined based on the machining conditions for the workpiece; and a machined-surface length extending from a machined surface being machined at a tip end of the tool electrode to a top surface of the workpiece, wherein said jump-up quantity estimating module estimates an optimal jump-up quantity for the tool electrode based on the shape information of the tool electrode, the spark gap, and the machined-surface length.

5. The jump control apparatus for an electric discharge shaping/profiling machine according to claim 3, wherein the parameters include kinematic viscosity of the processing liquid, and said jumping velocity estimating module estimates the jumping velocity of the tool electrode required, at a minimum, based on the kinematic viscosity of the processing liquid.

6. The jump control apparatus for an electric discharge shaping/profiling machine according to claim 3, wherein the parameters include:

a spark gap between the tool electrode and the workpiece;

a machined-surface length extending from a machined surface being machined at a tip end of the tool electrode to a top surface of the workpiece;

an outer peripheral length of the tool electrode at the top surface of the workpiece;

a machining area defined at the tip end of the tool electrode;

kinematic viscosity of the processing liquid; and a constant indicating a ratio between an inertia force and a viscous force of the processing liquid, wherein the constant is set to a value greater than "10" depending on the jumping velocity of the tool electrode estimated by said jumping velocity estimating module, said jump-up quantity estimating module estimates, arithmetically, an optimum jump-up quantity for the tool electrode based on the parameters in accordance with ju=d·h·L/S, and said jumping velocity estimating module estimates, arithmetically, the jumping velocity of the tool electrode required, at a minimum, based on the parameters in accordance with jmp=Re·L·n/S.

7. The jump control apparatus for an electric discharge shaping/profiling machine according to claim 3, wherein the parameters include:

a spark gap between the tool electrode and the workpiece;

a machined-surface length extending from a machined surface being machined at a tip end of the tool electrode to a top surface of the workpiece;

an outer peripheral length of the tool electrode at the top surface of the workpiece;

a tip end width of the tool electrode;

kinematic viscosity of the processing liquid; and a constant indicating a ratio between an inertia force and a viscous force of the processing liquid, wherein the constant is set to a value greater than "10" depending on the jumping velocity of the tool electrode estimated by said jumping velocity estimating module, and the tool electrode has a rib-like shape, said jump-up quantity estimating module estimates, arithmetically, an optimum jump-up quantity for the tool electrode based on the parameters in accordance with ju=2d·h/w, while said jumping velocity estimating module estimates, arithmetically, the jumping velocity of the tool electrode required, at a minimum, based on the parameters in accordance with jmp=2Re·n/w.

8. A jump control apparatus for an electric discharge shaping/profiling machine for machining a workpiece by applying a pulse voltage across a tool electrode mounted at one end of a main spindle and the workpiece disposed in opposition to the tool electrode with a processing liquid intervening therebetween, the apparatus comprising:

a feed control unit for controlling a feed quantity of a main spindle to control a vertical position of a tool electrode relative to a workpiece;

a jump condition estimating unit for estimating jump conditions for effectuating jump motion of the tool electrode for discharging sludge from between the tool electrode and the workpiece in a machining process performed on the workpiece, the jump conditions estimated being input to said feed control unit;

an input unit for inputting machining conditions considering the jump conditions in precedence to a machining process to be performed on the workpiece; and a numerical control unit for determining, arithmetically, parameters depending on the machining conditions and input to said jump condition estimating unit, wherein said jump condition estimating unit estimates the jump conditions based on the parameters in precedence to machining of the workpiece.

9. The jump control apparatus for an electric discharge shaping/profiling machine according to claim 8, further comprising machining stage detecting means for detecting machining stages of the workpiece based on movement of the main spindle, wherein the machining conditions include a plurality of preset values which differ depending on the machining stages, and said numerical control unit arithmetically determines the parameters based on the machining conditions corresponding to the machining stages, respectively.

10. The jump control apparatus for an electric discharge shaping/profiling machine according to claim 8, wherein the parameters include shape information concerning the tool electrode, and wherein said jump condition estimating unit includes:

a jump-up quantity estimating module estimating jump-up quantity of the tool electrode; and a jumping velocity estimating module estimating jumping velocity of the tool electrode.

11. The jump control apparatus for an electric discharge shaping/profiling machine according to claim 10, wherein the parameters include:

a spark gap between the tool electrode and the workpiece, arithmetically determined based on the machining conditions for the workpiece; and a machined-surface length extending from a machined surface being machined at a tip end of the tool electrode to a top surface of the workpiece, wherein said jump-up quantity estimating module estimates an optimal jump-up quantity for the tool electrode based on the shape information of the tool electrode, the spark gap, and the machined-surface length.

12. The jump control apparatus for an electric discharge shaping/profiling machine according to claim 10, wherein the parameters include kinematic viscosity of the processing liquid, and said jumping velocity estimating module estimates the jumping velocity of the tool electrode required, at a minimum, based on the kinematic viscosity of the processing liquid.

13. The jump control apparatus for an electric discharge shaping/profiling machine according to claim 10, wherein the parameters include:

a spark gap between the tool electrode and the workpiece;

a machined-surface length extending from a machined surface being machined at a tip end of the tool electrode to a top surface of the workpiece;

an outer peripheral length of the tool electrode at the top surface of the workpiece;

a machining area defined at the tip end of the tool electrode;

kinematic viscosity of the processing liquid; and a constant indicating a ratio between an inertia force and a viscous force of the processing liquid, wherein the constant is set to a value greater than "10" depending on the jumping velocity of the tool electrode estimated by said jumping velocity estimating module, said jump-up quantity estimating module estimates, arithmetically, an optimum jump-up quantity for the tool electrode based on the parameters in accordance with ju=d·h·L/S, and said jumping velocity estimating module estimates, arithmetically, the jumping velocity of the tool electrode required, at a minimum, based on the parameters in accordance with jmp=Re·L·n/S.

14. The jump control apparatus for an electric discharge shaping/profiling machine according to claim 10, wherein the parameters include:

a spark gap between the tool electrode and the workpiece;

a machined-surface length extending from a machined surface being machined at a tip end of the tool electrode to a top surface of the workpiece;

an outer peripheral length of the tool electrode at the top surface of the workpiece;

a tip end width of the tool electrode;

kinematic viscosity of the processing liquid; and a constant indicating a ratio between an inertia force and a viscous force of the processing liquid, wherein the constant is set to a value greater than "10" depending on the jumping velocity of the tool electrode estimated by said jumping velocity estimating module, and the tool electrode has a rib-like shape, said jump-up quantity estimating module estimates, arithmetically, an optimum jump-up quantity for the tool electrode based on the parameters in accordance with ju=2d·h/w, while said jumping velocity estimating module estimates, arithmetically, the jumping velocity of the tool electrode required, at a minimum, based on the parameters in accordance with jmp=2Re·n/w.

15. A jump control apparatus for an electric discharge shaping/profiling machine for machining a workpiece by applying a pulse voltage across a tool electrode mounted at one end of a main spindle and the workpiece disposed in opposition to the tool electrode with a processing liquid intervening therebetween, the apparatus comprising:

a feed control unit for controlling a feed quantity of a main spindle to control a vertical position of a tool electrode relative to a workpiece;

a jump condition estimating unit for estimating jump conditions for effectuating jump motion of the tool electrode for discharging sludge from between the tool electrode and the workpiece in a machining process performed on the workpiece, the jump conditions estimated being input to said feed control unit;

an input unit for inputting machining conditions considering the jump conditions in precedence to a machining process to be performed on the workpiece; and a numerical control unit for determining, arithmetically, parameters depending on the machining conditions and input to said jump condition estimating unit, wherein said jump condition estimating unit determines values for the jump conditions through inference based on the parameters, upon starting of machining of the workpiece, the values being output.

16. The jump control apparatus for an electric discharge shaping/profiling machine according to claim 15, further comprising machining stage detecting means for detecting machining stages of the workpiece based on movement of the main spindle, wherein the machining conditions include a plurality of preset values which differ depending on the machining stages, and said numerical control unit arithmetically determines the parameters based on the machining conditions conforming to the machining stages, respectively.

17. The jump control apparatus for an electric discharge shaping/profiling machine according to claim 15, wherein the parameters include shape information concerning the tool electrode, and wherein said jump condition estimating unit includes:

a jump-up quantity estimating module estimating jump-up quantity of the tool electrode; and a jumping velocity estimating module estimating jumping velocity of the tool electrode.

18. The jump control apparatus for an electric discharge shaping/profiling machine according to claim 17, wherein the parameters include:

a spark gap between the tool electrode and the workpiece, arithmetically determined based on the machining conditions for the workpiece; and a machined-surface length extending from a machined surface being machined at a tip end of the tool electrode to a top surface of the workpiece, wherein said jump-up quantity estimating module estimates an optimal jump-up quantity for the tool electrode based on the shape information of the tool electrode, the spark gap, and the machined-surface length.

19. The jump control apparatus for an electric discharge shaping/profiling machine according to claim 17, wherein the parameters include kinematic viscosity of the processing liquid, and said jumping velocity estimating module estimates the jumping velocity of the tool electrode required, at a minimum, based on the kinematic viscosity of the processing liquid.

20. The jump control apparatus for an electric discharge shaping/profiling machine according to claim 17, wherein the parameters include:

a spark gap between the tool electrode and the workpiece;

a machined-surface length extending from a machined surface being machined at a tip end of the tool electrode to a top surface of the workpiece;

an outer peripheral length of the tool electrode at the top surface of the workpiece;

a machining area defined at the tip end of the tool electrode;

kinematic viscosity of the processing liquid; and a constant indicating a ratio between an inertia force and a viscous force of the processing liquid, wherein the constant is set to a value greater than "10" depending on the jumping velocity of the tool electrode estimated by said jumping velocity estimating module, said jump-up quantity estimating module estimates, arithmetically, an optimum jump-up quantity for the tool electrode based on the parameters in accordance with ju=d·h·L/S, and said jumping velocity estimating module estimates, arithmetically, the jumping velocity of the tool electrode required, at a minimum, based on the parameters in accordance with jmp=Re·L·n/S.

* * * * *